J. W. EAST.
WAVE MOTOR.
APPLICATION FILED DEC. 2, 1911.
1,032,996.
Patented July 16, 1912.
3 SHEETS—SHEET 1.
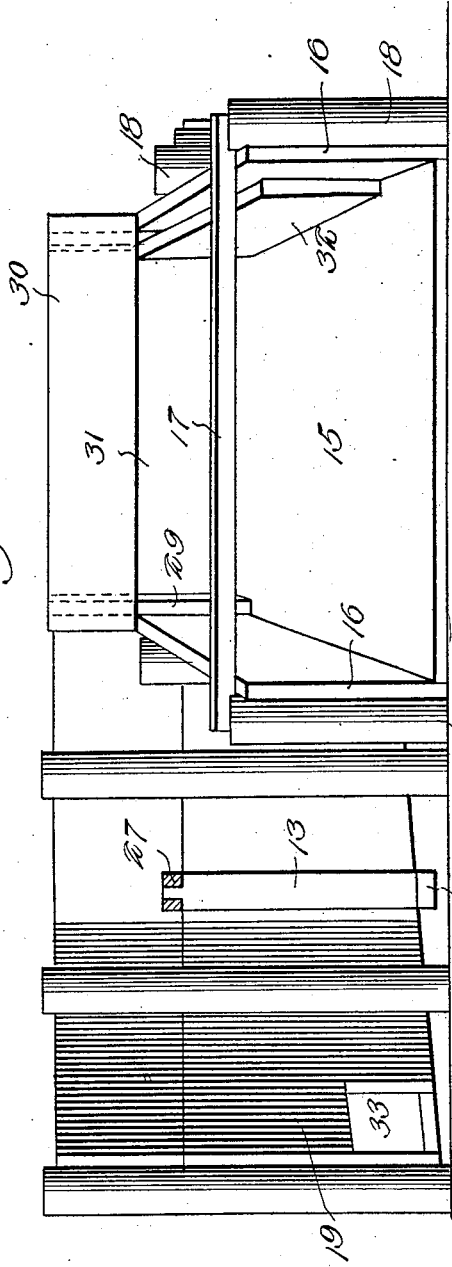
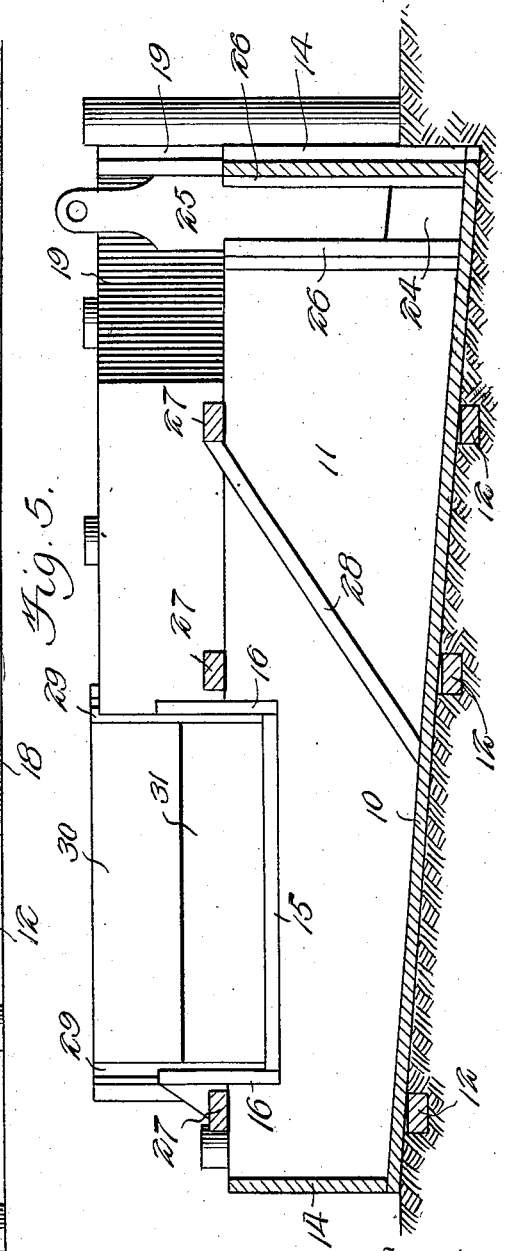
Witnesses
Inventor
John W. East
By Victor J. Evans
Attorney

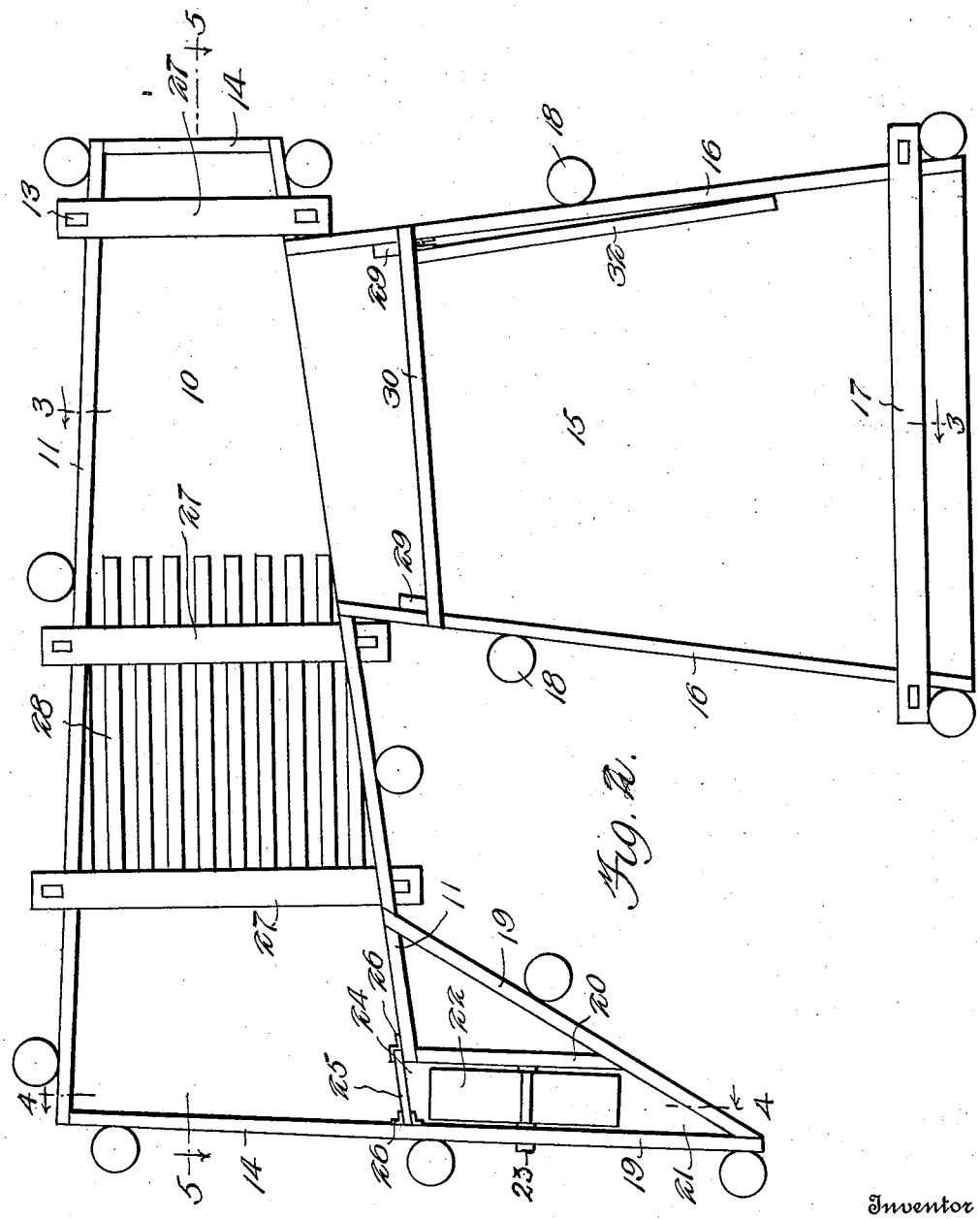

J. W. EAST.
WAVE MOTOR.
APPLICATION FILED DEC. 2, 1911.

1,032,996.

Patented July 16, 1912.

3 SHEETS—SHEET 3.

Witnesses
Hugh H. Ott

Inventor
John W. East
By Victor J. Evans
Attorney

UNITED STATES PATENT OFFICE.

JOHN W. EAST, OF DELPHOS, OHIO.

WAVE-MOTOR.

1,032,996. Specification of Letters Patent. Patented July 16, 1912.

Application filed December 2, 1911. Serial No. 663,482.

*To all whom it may concern:*

Be it known that I, JOHN W. EAST, a citizen of the United States, residing at Delphos, in the county of Allen and State of Ohio, have invented new and useful Improvements in Wave-Motors, of which the following is a specification.

The invention relates to water motors, and more particularly to the class of tide or wave motors.

The primary object of the invention is the provision of a motor in which the force of waves from a body of water may be utilized for driving a water wheel, whereby power may be derived therefrom for running machinery.

Another object of the invention is the provision of a motor of this character in which sea-weed or other debris will be prevented from interfering with the rotation of the water wheel from which driving energy is obtained for operating machinery or the like.

A further object of the invention is the provision of a motor of this character in which the waves will be caused to travel over a fall, thereby maintaining the maximum power therefrom for the rotation of the driving wheel, thus assuring maximum power for the operation of the machinery or the like.

A still further object of the invention is the provision of a water motor of this character which is simple in construction, thoroughly reliable and efficient in operation, and inexpensive in manufacture.

With these and other objects in view, the invention consists in the construction, combination and arrangement of parts, as will be hereinafter more fully described, illustrated in the accompanying drawings, and pointed out in the claims hereunto appended.

Figure 3:
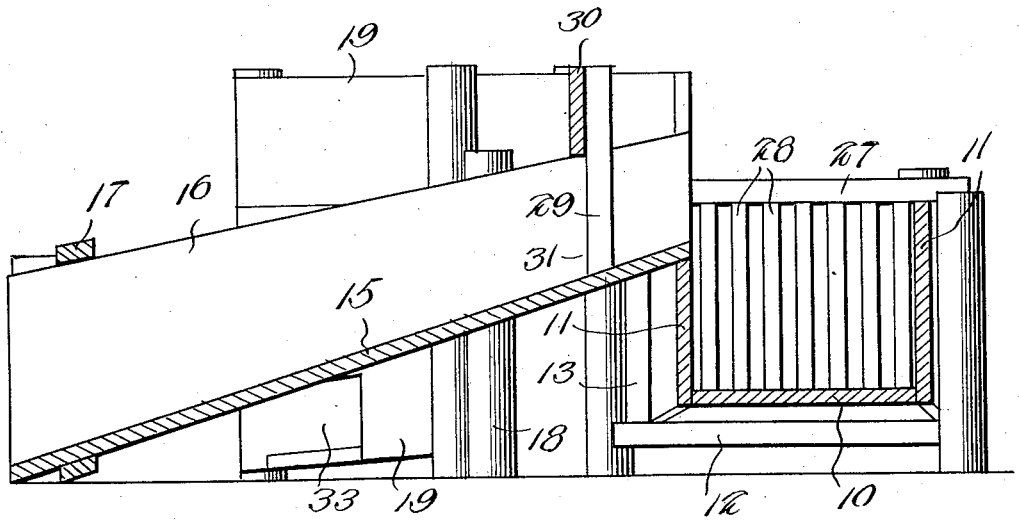
Figure 4:
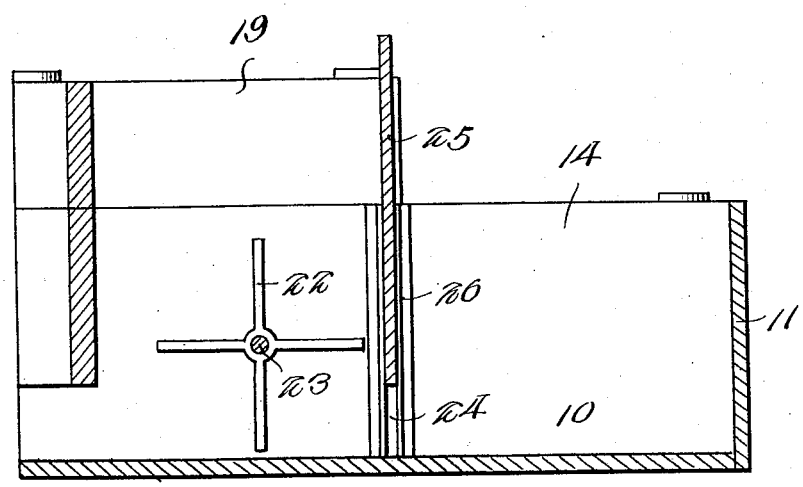

In the drawings: Figure 1 is an elevation of a wave motor constructed in accordance with the invention. Fig. 2 is a top plan view thereof. Fig. 3 is a sectional view on the line 3—3 of Fig. 2. Fig. 4 is a sectional view on the line 4—4 of Fig. 2. Fig. 5 is a sectional view on the line 5—5 of Fig. 2.

Similar reference characters indicate corresponding parts throughout the several views of the drawings.

Referring to the drawings by numerals, the wave motor comprises generally an inlet chute, a trough, an outlet box communicating with the latter, and a water driven power wheel, the trough being provided with a slanting bottom 10, converging side walls 11 rising therefrom, the bottom being superimposed upon base cross sills 12 having connected thereto vertical posts 13, to which are connected the side walls 11 of the trough. Located at opposite ends of the trough are the end walls 14, it being understood that the lower portion of the trough is buried in a foundation, so that its shallow portion will lie upon the foundation, thereby causing water falling within the trough to gravitate toward its lower portion.

The chute comprises an inclined bed 15, the inner edge of which is fixed to the upper edge of one side wall 11 of the trough, while the opposite edge faces the waves directed from a suitable body of water, and rising from this bed 15, at opposite side edges thereof, are side boards 16, converging toward the chute, the bed and side boards 15 and 16 being fixed in a hurdle 17 located near the lower free end thereof. Also fixed exteriorly to the side boards 16 are suitable legs 18 which prevent the sinking or sagging of the said chute, when subjected to excessive water force, the waves being thrown upwardly in the chute and delivered into the trough, for a purpose presently described.

The water wheel box comprises side walls 19, one of which is a continuation of the end wall of the trough, while the other one is fixed to one side wall of said trough and converges toward the said continuation of the end wall. Arranged within the water wheel box, spaced from and parallel with the side wall 19 thereof forming a continuation of the end wall of the trough, is a partition 20 providing a water runway 21, in which is arranged a paddle water wheel 22, the same being fixed to a shaft 23 journaled in the said partition 20 and wall 19 adjacent thereto. The side wall 11 of the trough adjacent to the water wheel box is cut away to provide an opening 24, so that communication will be established between the water runway 21 and the trough, the opening 24 being normally closed or regulated by means of a slide gate 25 mounted in guide cleats 26, so that the water supply to the wheel may be increased or decreased, as desired, thereby regulating the speed of travel of the paddle wheel, it being understood, of course, that the machinery or like to be operated is suitably connected with the shaft 23 to receive the driving energy therefrom.

Bridging the trough and secured to the vertical posts 13 are upper cross bars or beams 27, and to one of these beams is fixed a plurality of spaced parallel guard bars or slats 28, the same being also fixed to the bottom 10 of the trough and are disposed at an inclination, the said slats or bars being designed to prevent weeds or other debris in the water from interfering with the water wheel 22, when the water is let into the runway 21 for rotating the wheel.

Fixed to the side boards 16 of the chute, at the inner end thereof, are uprights 29, to which is fixed an overflow board 30, below which is formed a water inlet 31 to permit the waves to flow into the trough, the said inlet adapted to be closed by a hinged door 32 connected to one side board 16 of the chute, the door being normally open to permit the waves to flow into the trough.

In the operation of the device, the waves, when traveling upon the shore bordering a body of water, enter the chute, traveling upwardly of the same, and fall through the inlet 31 into the chute, whence the water is let into the water wheel box to rotate the paddle wheel 22. Thus, in this manner, the power of the water wheel will be utilized for driving machinery or the like, the shaft 23 being adapted for connection with the latter for operating the same.

What is claimed is:

1. A wave motor, comprising a box-like trough, a forwardly inclined chute communicating with the trough at one end thereof, a water gate mounted at the inner end of the chute and adapted to close the same, a water wheel box projecting from the opposite end of said trough and having a water channel therein, a water wheel journaled in said box, a gate for regulating the flow of water from the trough to the water channel in the said box, and guard slats rising from the bottom of the trough between opposite ends thereof.

2. A wave motor, comprising a box-like trough, a forwardly inclined chute communicating with the trough at one end thereof, a water gate mounted at the inner end of the chute and adapted to close the same, a water wheel box projecting from the opposite end of said trough and having a water channel therein, a water wheel journaled in said box, a gate for regulating the flow of water from the trough to the water channel in the said box, and guard slats rising from the bottom of the trough between the opposite ends thereof, the said trough being provided with a bottom inclined toward the said box.

In testimony whereof I affix my signature in presence of two witnesses.

JOHN W. EAST.

Witnesses:
   CATHERINE KLEEKAMP,
   C. E. MARSH.

---

Copies of this patent may be obtained for five cents each, by addressing the "Commissioner of Patents, Washington, D. C."